United States Patent
Jang et al.

(10) Patent No.: US 7,448,771 B2
(45) Date of Patent: Nov. 11, 2008

(54) BACKLIGHT ASSEMBLY AND LIQUID CRYSTAL DISPLAY APPARATUS USING THE SAME

(75) Inventors: Hyeon-Yong Jang, Osan-si (KR); Nam-Ok Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 135 days.

(21) Appl. No.: 11/336,577

(22) Filed: Jan. 19, 2006

(65) Prior Publication Data

US 2006/0164829 A1    Jul. 27, 2006

(30) Foreign Application Priority Data

Jan. 24, 2005    (KR) .................. 10-2005-006318

(51) Int. Cl.
*F21V 21/00*    (2006.01)

(52) U.S. Cl. .................. 362/235; 362/249; 362/260

(58) Field of Classification Search ............... 362/235, 362/260, 249, 263, 217, 225, 29; 445/26, 445/43; 313/485, 483, 484, 234, 607, 594
See application file for complete search history.

(56) References Cited

U.S. PATENT DOCUMENTS

| | | | | |
|---|---|---|---|---|
| 5,509,841 | A * | 4/1996 | Winsor | 445/26 |
| 2002/0070660 | A1 * | 6/2002 | Moon | 313/483 |
| 2005/0128771 | A1 * | 6/2005 | Tanaka | 362/613 |
| 2005/0146898 | A1 * | 7/2005 | Wu et al. | 362/632 |

* cited by examiner

*Primary Examiner*—Thomas M Sember
(74) *Attorney, Agent, or Firm*—MacPherson Kwok Chen & Heid LLP

(57) ABSTRACT

A backlight assembly includes a bottom chassis, a flat fluorescent lamp, a frame and a reflecting member. The flat fluorescent lamp is supported in the bottom chassis, and the flat fluorescent lamp includes a plurality of discharge spaces to generate light. The frame is combined with the bottom chassis to hold the flat fluorescent lamp. The reflecting member in one embodiment is coupled to the frame to cover an edge portion of the flat fluorescent lamp. In another embodiment, the reflecting member is integral with the frame.

19 Claims, 9 Drawing Sheets

BACKLIGHT ASSEMBLY AND LIQUID CRYSTAL DISPLAY APPARATUS USING THE SAME

CROSS-REFERENCE TO RELATED APPLICATION

This application relies for priority upon Korean Patent Application No. 2005-6318 filed on Jan. 24, 2005, the contents of which are herein incorporated by reference in its entirety.

BACKGROUND OF THE INVENTION

1. Field of the Invention

The present invention relates to a backlight assembly and a liquid crystal display apparatus using the same. More particularly, the present invention relates to a backlight assembly capable of improving brightness uniformity and a liquid crystal display using the backlight assembly.

2. Description of the Related Art

In general, a liquid crystal display apparatus displays an image using optical and electrical properties of a liquid crystal material, such as an anisotropic refractive index, and an anisotropic dielectric constant. A liquid crystal display apparatus has several advantages such as having a relatively thin thickness, being lightweight, requiring low driving voltage, and using low power consumption in comparison with a display apparatus such as a cathode ray tube, a plasma display panel and so on, so that the liquid crystal display apparatus is widely applied to various industries.

In order to supply light to a liquid crystal display panel, the liquid crystal display apparatus requires a backlight assembly since its display panel is not self-emissive.

A tubular-shaped cold cathode fluorescent lamp is often used as a light source for a liquid crystal display apparatus. However a large liquid crystal display apparatus requires the use of a plurality cold cathode fluorescent lamps which increases the manufacturing costs. Also, optical properties such as brightness and uniformity of light are a problem when using a plurality of cold cathode fluorescent lamps.

Recently a flat fluorescent lamp emitting a planar light has been developed and this device reduces the manufacturing costs and enhances the brightness uniformity. The flat fluorescent lamp includes a plurality of discharge spaces which improves the uniformity of the light emitted. When a voltage is applied to the electrodes of a flat fluorescent lamp, a plasma discharge is generated in each of the discharge spaces. A fluorescent layer inside the flat fluorescent lamp is excited in response to ultraviolet light caused by the plasma discharge and this generates a visible light.

In the prior art a typical backlight assembly employing a flat fluorescent lamp as a light source includes a bottom chassis to receive the flat fluorescent lamp, and a frame coupled to the bottom chassis to hold edge portions of the flat fluorescent lamp. However, the prior art frame typically has a relatively low light reflectance. Also, a frit which is used to combine a lower substrate with an upper substrate absorbs a light, which produces a shadow on an area corresponding to lower and upper end portions of the flat fluorescent lamp which deteriorates the brightness uniformity of the light from the backlight assembly.

SUMMARY OF THE INVENTION

The present invention provides a backlight assembly which improves the brightness-uniformity of light.

The present invention also provides a liquid crystal display apparatus including the above backlight assembly.

In one aspect of the present invention, a backlight assembly includes a bottom chassis, a flat fluorescent lamp, a first frame and a reflecting member. The flat fluorescent lamp is received in a receiving space of the bottom chassis, and the flat fluorescent lamp includes a plurality of discharge spaces to generate a light. The first frame is combined with the bottom chassis to hold the flat fluorescent lamp. A reflecting member is provided on the first frame to cover an edge portion of the flat fluorescent lamp.

In another aspect of the present invention, a backlight assembly includes a bottom chassis, a flat fluorescent lamp and a first frame. The flat fluorescent lamp is received in a receiving space of the bottom chassis, and the flat fluorescent lamp includes a plurality of discharge spaces to generate a light. The first frame is combined with the bottom chassis to hold the flat fluorescent lamp, and the first frame includes reflective portion to cover an edge portion of the flat fluorescent lamp.

In still another aspect of the present invention, a liquid crystal display apparatus includes a backlight assembly and a liquid crystal display panel.

The backlight assembly includes a bottom chassis, a flat fluorescent lamp, a first frame, and a reflecting member. The flat fluorescent lamp is received in a receiving space of the bottom chassis, and the flat fluorescent lamp includes a plurality of discharge spaces to generate light. The mold frame is combined with the bottom chassis to hold the flat fluorescent lamp. The reflecting member is coupled to the first frame to cover an edge portion of the flat fluorescent lamp.

The liquid crystal display panel displays an image using light from the backlight assembly.

In further still another aspect of the present invention, a liquid crystal display apparatus includes a backlight assembly and a liquid crystal display panel.

The backlight assembly includes a bottom chassis, a flat fluorescent lamp and a first frame. The flat fluorescent lamp is received in a receiving space of the bottom chassis, and the flat fluorescent lamp includes a plurality of discharge spaces to generate a light. The first frame is combined with the bottom chassis to hold the flat fluorescent lamp, and the first frame includes a reflective portion to cover an edge portion of the flat fluorescent lamp.

The liquid crystal display panel displays an image using a light from the backlight assembly.

According to the above, the backlight assembly eliminates a shadow which would otherwise be generated in an area corresponding to upper and lower ends portions of the flat fluorescent lamp, and thereby improves the brightness uniformity of light from the backlight assembly.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
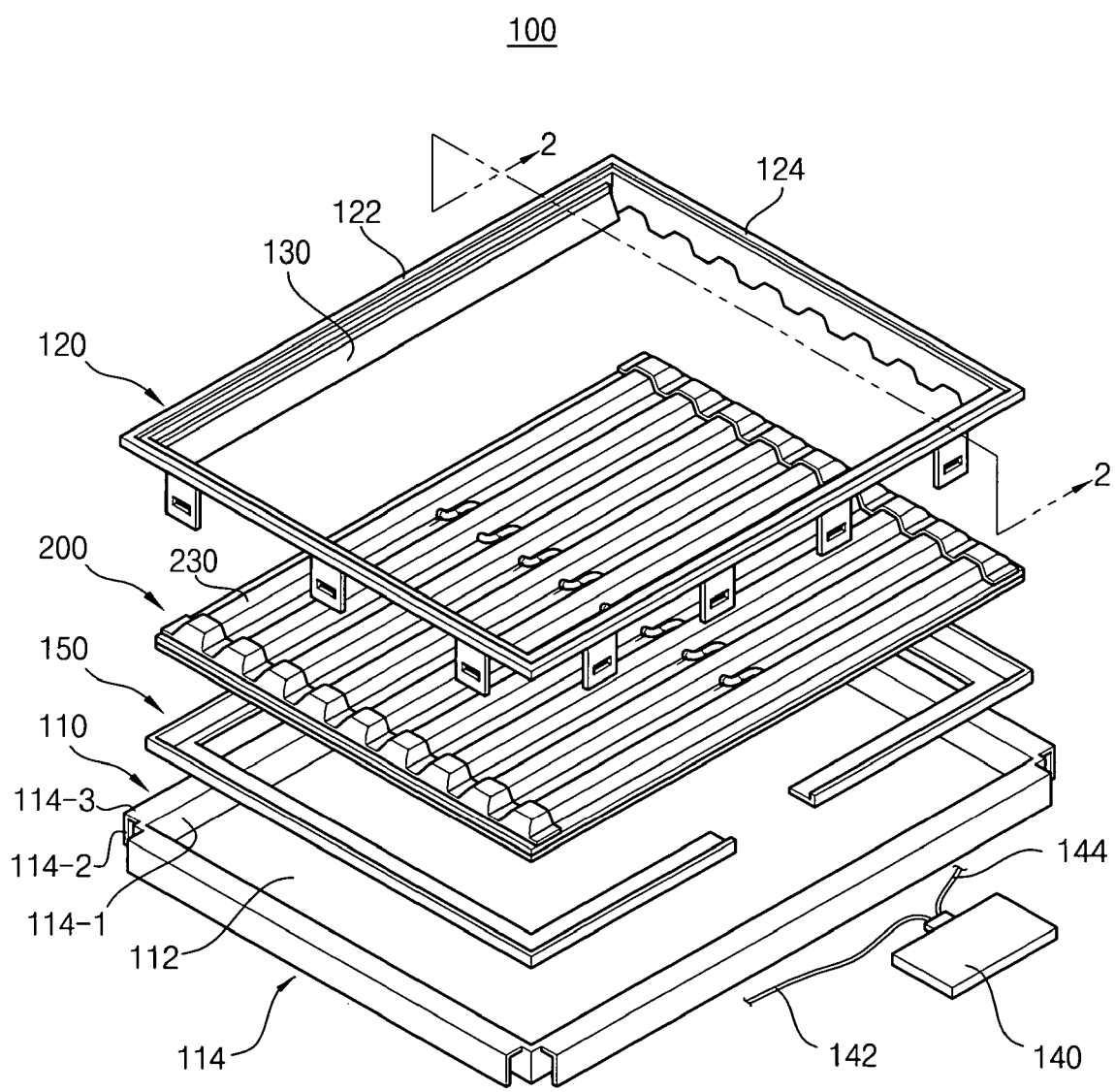
FIG. 1 is an exploded perspective view illustrating a backlight assembly in accordance with an exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout. It will be understood that when an element such as a layer, region or substrate is referred to as being "on" or "onto" another element, it can be directly on the other element or intervening elements may also be present.

Figure 2:
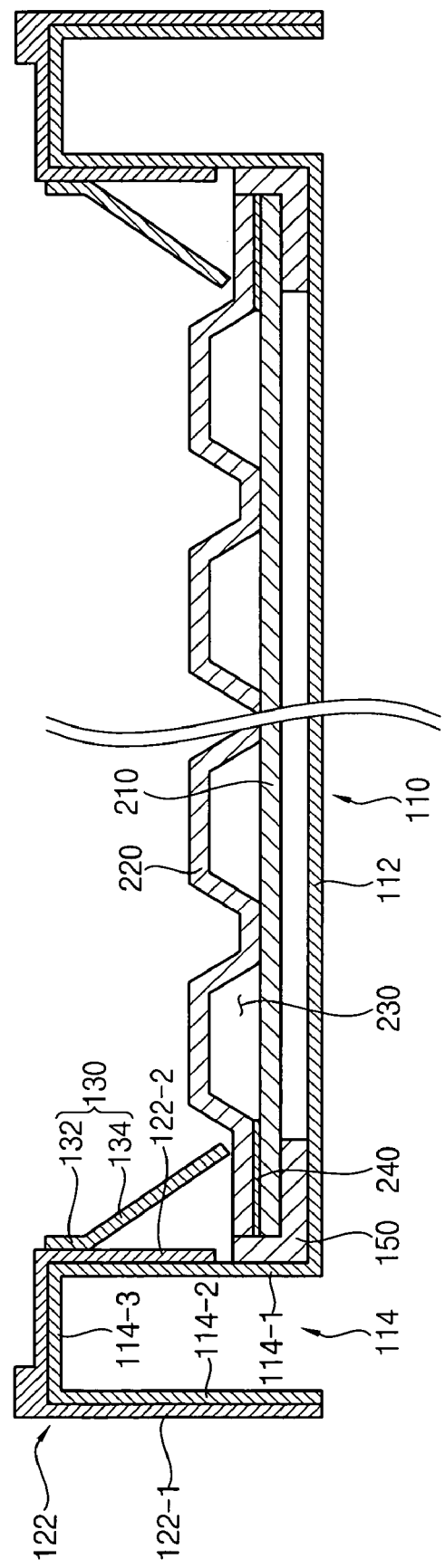
FIG. 2 is a cross-sectional view taken along line 2-2 in FIG. 1 of the backlight assembly in FIG. 1 in an assembled state.

FIG. 1 is an exploded perspective view illustrating a backlight assembly in accordance with an exemplary embodiment of the present invention. FIG. 2 is a cross-sectional view taken along a line 2-2 of the structure in FIG. 1 as assembled.

Referring to FIGS. 1 and 2, a backlight assembly 100 includes a bottom chassis 110, a flat fluorescent lamp 200, a first frame 120 and a reflecting member 130.

The bottom chassis 110 includes a bottom portion 112 and a sidewall 114 which extends upwardly from an edge portion of the bottom portion 112 to receive the flat fluorescent lamp 200. Sidewall 114 is U-shaped as will be appreciated from FIG. 2, and includes a first wall portion 114-1 which extends upwardly from bottom portion 112, a bright portion 114-3 and a downwardly extending wall 114-2. Bottom chassis 110 is constructed from a metal that has a relatively high strength and low deformation property.

The flat fluorescent lamp 200 is received in a receiving space of the bottom chassis 110. The flat fluorescent lamp 200 has a substantially rectangular shape when viewed on a plane thereof. The flat fluorescent lamp 200 has a plurality of discharge spaces 230. The flat fluorescent lamp 200 generates a plasma discharge in the discharge spaces 230 in response to a discharge voltage from an inverter 140 to convert an invisible light generated while performing the plasma discharge into a visible light.

The flat fluorescent lamp 200 includes a first substrate 210 and a second substrate 220, and the first and second substrates 210 and 220 are combined with each other to form the discharge spaces 230. The first and second substrates 210 and 220 are combined with each other by a sealing member 240 disposed between edge portions of the first and second substrates 210 and 220. The sealing member 240 may comprise, for example, a frit having a lower melting point than glass.

The first mold 120 is combined with the bottom chassis 110 to hold the flat typed fluorescent lamp 200 that is received in the bottom chassis 110. The first frame 120 is coupled to an upper portion of the flat fluorescent lamp 200 and the sidewall 114 of the bottom chassis 110 to hold an edge portion of the flat fluorescent lamp 200.

Referring to FIG. 2, the first frame 120 includes a first side portion 122 which includes a first wall portion 122-1 and a second wall portion 122-2, which form a U-shaped structure which mates with walls 114-1, 114-2 and 114-3 of sidewall 114. The first frame 120 also includes a second side portion 124. The first side portion 122 extends parallel to a longitudinal side of the flat fluorescent lamp 200, and extends in a direction that is substantially in parallel with a longitudinal direction of the discharge spaces 230. The second side portion 124 extends parallel to a horizontal side of the flat fluorescent lamp 200, and is extended from the first side portion 122 in a direction substantially in perpendicular to the first side portion 122. The second side portion 124 covers an electrode portion of the flat fluorescent lamp 200 from which a light is not emitted, and holds an edge portion of the horizontal side of the flat fluorescent lamp 200. The first frame 120 has a substantially frame shape, and the first side portion 122 is integrally formed with the second side portion 124. Alternatively, the first frame 120 may have two pieces of a 'U' shape or 'L' shape, or four pieces corresponding to each of sides of the flat fluorescent lamp 200.

The reflecting member 130 is combined with the first frame 120 that corresponds to a longitudinal side of the flat fluorescent lamp 200. In other words, the reflecting member 130 is combined with the second wall portion 122-2 of the first frame 120.

The reflecting member 130 includes a coupling portion 132 coupled to the second wall portion 122-2 and reflective portion 134 which extends from the coupling portion 132 to cover the edge portion of the flat fluorescent lamp 200. The coupling portion 132 is coupled to the first side portion 122 by using, for example, an adhesive. The reflective portion 134 is slanted toward the flat fluorescent lamp 200 from the coupling portion 132 to cover an area in which the sealing member 240 is placed.

The reflecting member 130 includes a white-colored film that has a relatively high reflectance. The white-colored film includes a material such as polycarbonate (PC), and polyethylene terephthalate (PET).

The reflecting member 130 reflects a light advancing toward the first side portion 122 from the flat fluorescent lamp 200 to an upper portion of the flat fluorescent lamp 200 thereby removing a shadow which would otherwise be generated in the edge portions of the flat fluorescent lamp 200.

The backlight assembly 100 further includes an inverter 140 to generate a discharge voltage for light emission of the flat fluorescent lamp 200. The inverter 140 is disposed outside the bottom chassis 110. For example, the inverter 140 may be disposed on a rear side of the bottom chassis 110. The inverter 140 boosts an alternating current (AC) voltage at a low voltage level and outputs an AC voltage at a high voltage level suitable for driving the flat fluorescent lamp 200 as the discharge voltage. The discharge voltage is applied to the flat fluorescent lamp 200 through a first power line 142 and a second power line 144.

The backlight assembly 100 further includes an insulation member 150 disposed between the bottom chassis 110 and the flat fluorescent lamp 200. The insulation member 150 extends around the edge portions of the flat fluorescent lamp 200. The insulation member 150 separates the flat fluorescent lamp 200 from the bottom chassis 110 to prevent an electrical contact between the flat fluorescent lamp 200 and the bottom chassis 110. The insulation member 150 includes an elastic material such as silicone to absorb an impact form an exterior. In the embodiment shown in FIG. 1, insulation member 150 includes two L-shaped pieces each having a U-shape. Alternatively, the insulation member 150 may be integrally formed in a single body having a substantially frame shape.

Figure 3:
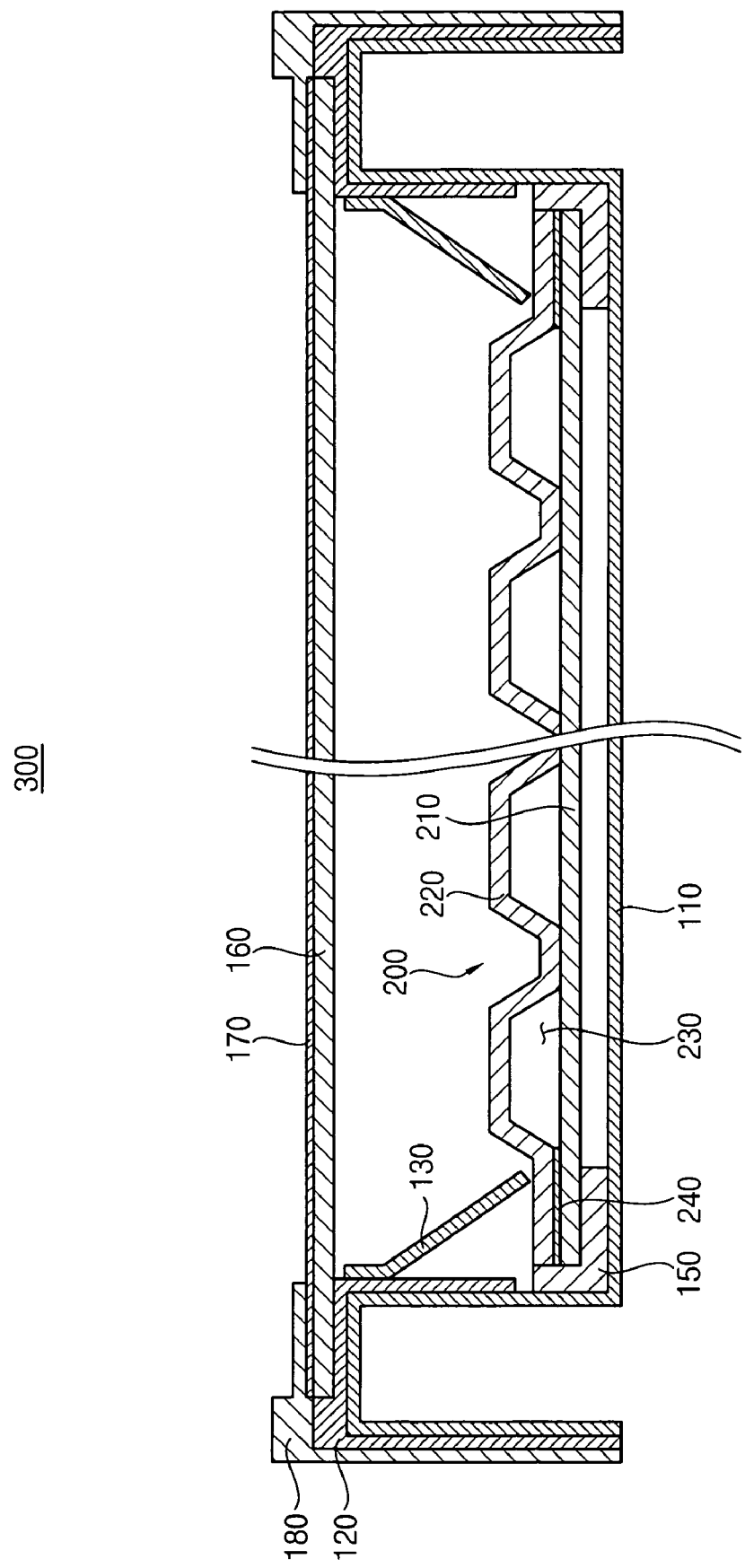
FIG. 3 is a cross-sectional view illustrating a backlight assembly in accordance with another exemplary embodiment of the present invention.

FIG. 3 is a cross-sectional view illustrating a backlight assembly 300 in accordance with another exemplary embodiment of the present invention. In the present embodiment, a backlight assembly has a same function and a same structure as those of the backlight assembly in FIG. 2 except for a diffusion plate, an optical sheet and a second mold frame. Therefore, only different parts to the backlight assembly will be described in here. In FIG. 3, the same reference numerals are used to refer to the same or like parts as those in FIG. 2.

Referring to FIG. 3, a backlight assembly 300 includes a bottom chassis 110, a flat fluorescent lamp 200, a first frame 120, a second frame 180, a reflecting member 130, a diffusion plate 160 and an optical sheet 170.

The diffusion plate 160 is supported by the first frame 120 above the flat fluorescent lamp 200. The diffusion plate 160 diffuses light emitted from the flat fluorescent lamp 200 to improve brightness-uniformity of the light. The diffusion plate 160 has a substantially plate-shape, and is spaced apart from the flat fluorescent lamp 200 by a predetermined distance. The diffusion plate 160 includes a transparent material that transmits a light, and a dispersant to diffuse the light. The diffusion plate 160 includes, for example, a poly methyl methacrylate (PMMA).

At least one optical sheet 170 is disposed on the diffusion plate 160. The optical sheet 170 changes a diffusion path of a light diffused by the diffusion plate 160 to increase brightness property of the light. The optical sheet 170 may further include a condensing sheet (not shown) to condense the light diffused through the diffusion plate 160 to increase a front brightness. In addition, the optical sheet 170 may further include a diffusion sheet (not shown) to diffuse the light diffused through the diffusion plate 160. Alternatively, the backlight assembly 300 may include variable optical sheets 170 having variable functions although not shown in FIG. 3.

The backlight assembly 300 further includes a second frame 180 to hold the diffusion plate 160 and the optical sheet 170. The second frame 180 is combined with a bottom chassis 110 to fix borders of the diffusion plate 160 and the optical sheet 170 to the bottom chassis 110. The second frame 180 is an integral structure. Alternatively, the second frame 180 may have a structure that is divided into a plurality of pieces.

Figure 4:
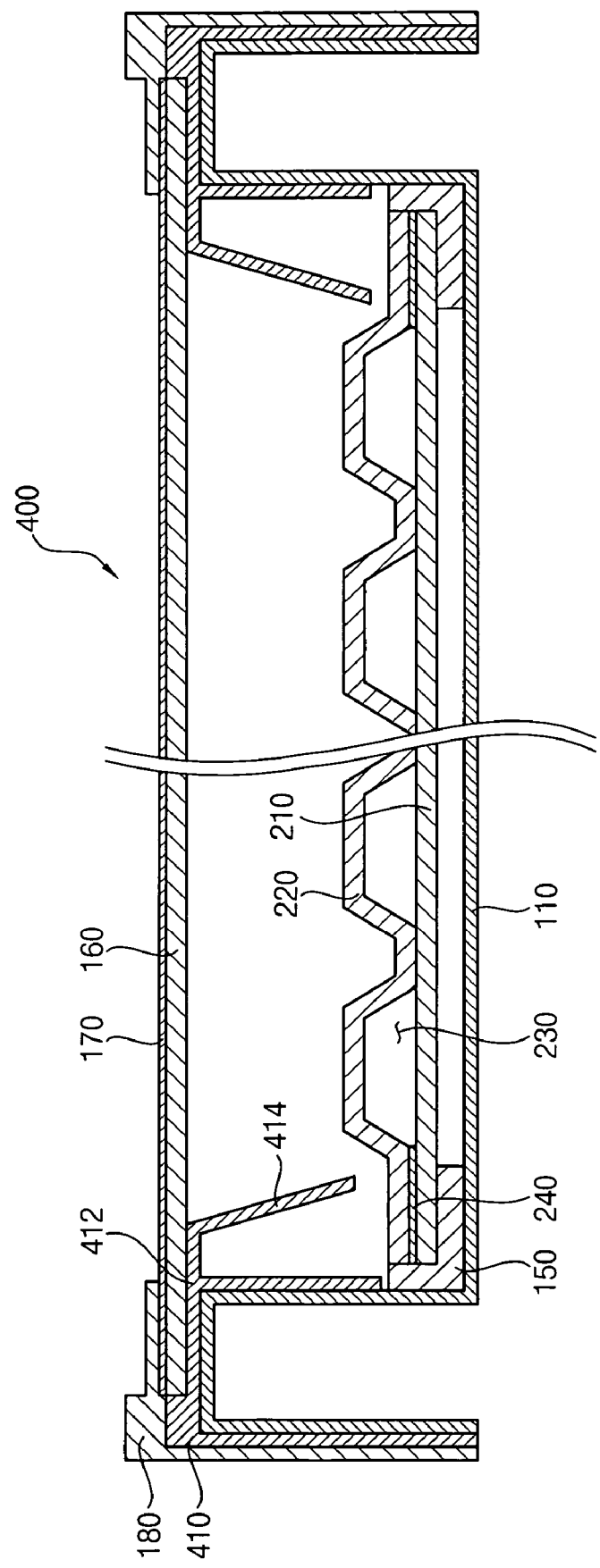
FIG. 4 is a cross-sectional view illustrating a backlight assembly in accordance with another exemplary embodiment of the present invention.

FIG. 4 is a cross-sectional view illustrating a backlight assembly 400 in accordance with still another exemplary embodiment of the present invention. In the present embodiment, a backlight assembly 400 has a same function and a same structure as those of the backlight assembly in FIG. 3 except that in the embodiment in FIG. 4 a different frame cooperates with bottom chassis 110. Therefore, only different parts to the backlight assembly will be described in here. In FIG. 4, the same reference numerals are used to refer to the same or like parts as those in FIG. 3 and any further repetitive descriptions will be omitted.

Referring to FIG. 4, frame 410 is combined with the bottom chassis 110 to hold a flat fluorescent lamp 200. The frame 410 has a reflective portion 414 that covers edge portions of the flat fluorescent lamp 200.

The frame 410 includes a first side portion 412 and a second side portion constructed like the second side portion 124 in FIG. 1. The first side portion 412 extends along a longitudinal side of the flat fluorescent lamp 200, and extends in a direction that is substantially in parallel with a longitudinal direction of the discharge space 230. The second side portion corresponds to a horizontal side of the flat fluorescent lamp 200, and is extended from the first side portion 412 in a direction substantially in perpendicular to the first side portion 412. In the manner illustrated and described in connection with assembly 100, the second side portion covers an electrode portion of the flat fluorescent lamp 200 that does not emit a light, and holds an edge portion of the horizontal side of the flat fluorescent lamp 200.

Reflective portion 414 is formed in the first side portion 412, and corresponds to the longitudinal side of the flat fluorescent lamp 200, and is slanted toward the flat fluorescent lamp 200 from an upper portion of the first side portion 412. The reflective portion 414 covers an edge portion of the flat fluorescent lamp 200 at which a sealant 240 is formed.

The reflective portion 414 reflects a light that is toward the first side portion 412 from the flat fluorescent lamp 200 to the diffusion plate 160. Therefore, a shadow which would otherwise be generated around the edge portion of the flat fluorescent lamp 200 is eliminated. The frame 410 having the reflective portion 415 includes a white-colored material having a high reflectance so as to reflect the light from the flat fluorescent lamp 200. Examples of the white-colored material that can be used for the frame 410 may include polycarbonate (PC), and polyethylene terephthalate (PET).

The reflective portion 414 is spaced apart from the flat fluorescent lamp 200 to increase an impact resistance of the flat fluorescent lamp 200. In case that the reflective portion 414 makes contact with the flat fluorescent lamp 200, an external impact may damage the reflective portion 414. In order to prevent the damage of the reflective portion 414, the reflective portion 414 is spaced apart from the flat fluorescent lamp 200 by more than about 2 mm.

Figure 5:
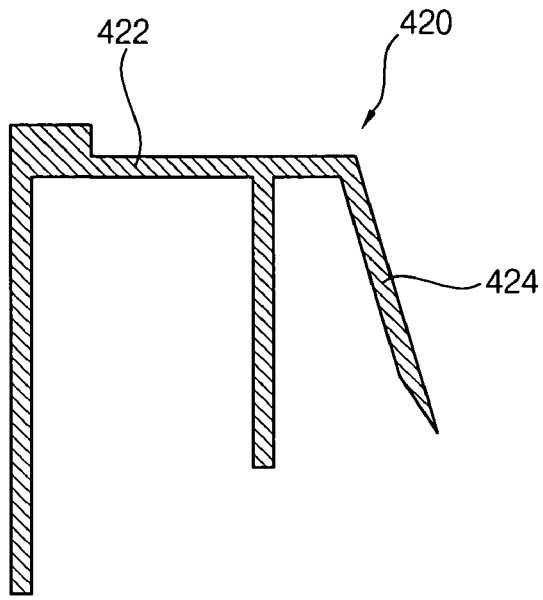
FIG. 5 is a cross-sectional view illustrating a first frame in accordance with still another exemplary embodiment of the present invention.

FIG. 5 is a cross-sectional view illustrating a frame in accordance with still another exemplary embodiment of the present invention.

Referring to FIG. 5, the frame 420 includes a first side portion 422 and a second side portion (not shown). The first side portion 422 is used in conjunction with a longitudinal side of the flat fluorescent lamp 200, and extends in a direction that is substantially in parallel with a longitudinal direction of the discharge space 230. The second side portion corresponds to a horizontal side of the flat fluorescent lamp 200, and is extended from the first side portion 422 in a direction substantially in perpendicular to the first side portion 422. The second side portion holds an edge portion of the horizontal side of the flat fluorescent lamp 200.

The frame 420 includes a reflective portion 424 formed in the first side portion 422. The reflective portion 424 is slanted toward the flat fluorescent lamp 200 from an upper portion of the first side portion 422 to cover an edge portion of the flat fluorescent lamp 200 at which a sealant 240 is formed.

The reflective portion 424 is spaced apart from the flat fluorescent lamp 200 to increase an impact resistance of the flat fluorescent lamp 200. In order to prevent the damage of the reflective portion 425, the reflective portion 424 is spaced apart from the flat fluorescent lamp 200 by more than about 2 mm. In addition, the reflective portion 424 becomes thinner in cross-section it comes closer to the flat fluorescent lamp 200, to thereby effectively reduce a damage caused by a collision between the reflective portion 424 and the flat fluorescent lamp 200. As the reflective portion 424 becomes narrower, ductility of the reflective portion 424 increases.

Figure 6:
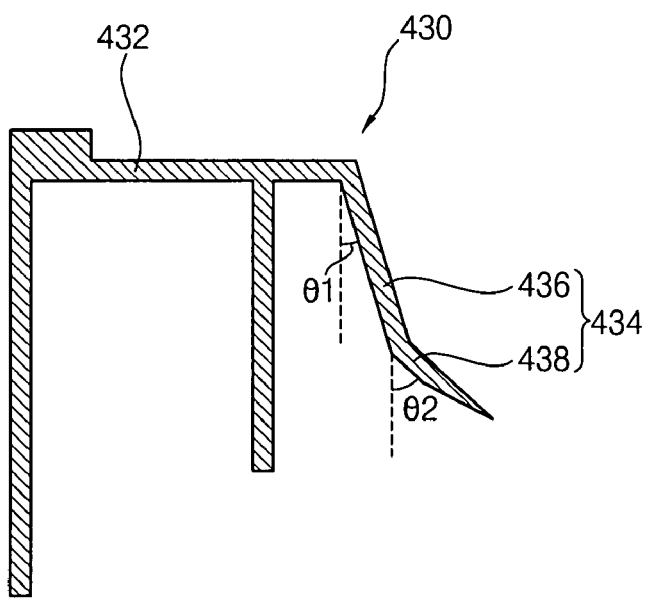
FIG. 6 is a cross-sectional view illustrating a first frame in accordance with still another exemplary embodiment of the present invention.

FIG. 6 is a cross-sectional view illustrating another frame in accordance with still another exemplary embodiment of the present invention.

Referring to FIG. 6, frame 430 includes a first side portion 432 and a second side portion (not shown). The first side portion 432 extend adjacent to a longitudinal side of the flat fluorescent lamp 200, and extends in a direction that is substantially in parallel with a longitudinal direction of the discharge space 230. The second side portion corresponds to a horizontal side of the flat fluorescent lamp 200, and is extended from the first side portion 432 in a direction substantially in perpendicular to the first side portion 412. The second side portion holds an edge portion of the horizontal side of the flat fluorescent lamp 200.

The frame 430 includes a reflective portion 434 formed in the first side portion 432. The reflective portion 424 is slanted toward the flat fluorescent lamp 200 from an upper portion of the first side portion 432 to cover an edge portion of the flat fluorescent lamp 200 at which a sealant 240 is formed.

The reflective portion 434 includes a first reflective portion 436 and a second reflective portion 438. The first reflective portion 436 is inclined by a first angle (θ1) with respect to a vertical face of the first side portion 432, and pointed toward the flat fluorescent lamp 200 to cover the edge portion of the flat fluorescent lamp 200.

The second reflective portion 438 is inclined by a second angle (θ2) with respect to the vertical face of the first side portion 432. The second angle (θ2) is larger than the first angle (θ1) The second reflective portion 438 becomes narrower as closer the second reflective portion 438 comes to the flat fluorescent lamp 200. In the present embodiment, the reflective portion 434 has the first and second reflective parts 436 and 438 having different inclinations with each other, so that buffering efficiency of buffering an impact caused by a collision between the reflective portion 434 and the flat fluorescent lamp 200 may improve.

Figure 7:
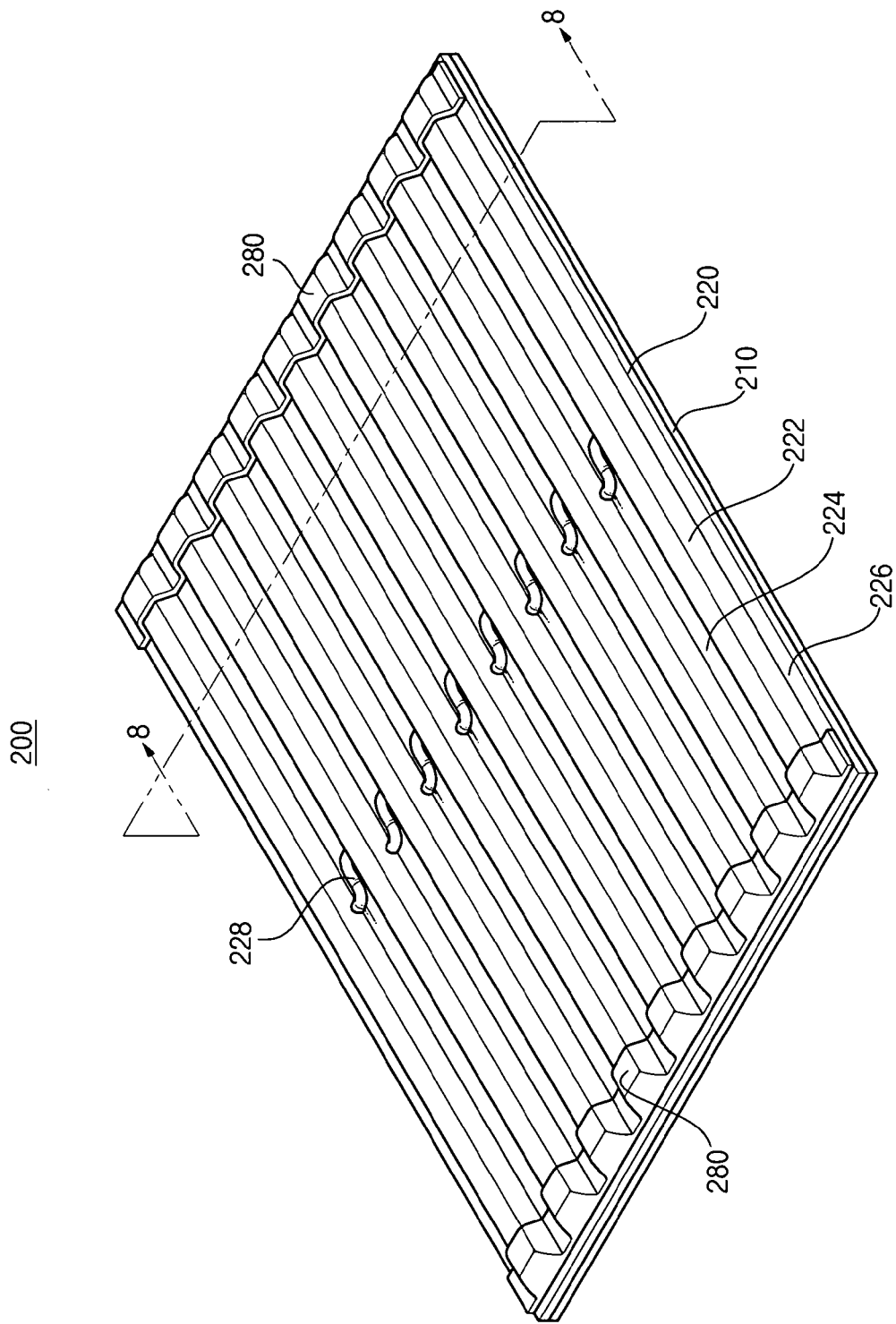
FIG. 7 is a perspective view illustrating a flat fluorescent lamp in FIG. 1.
Figure 8:
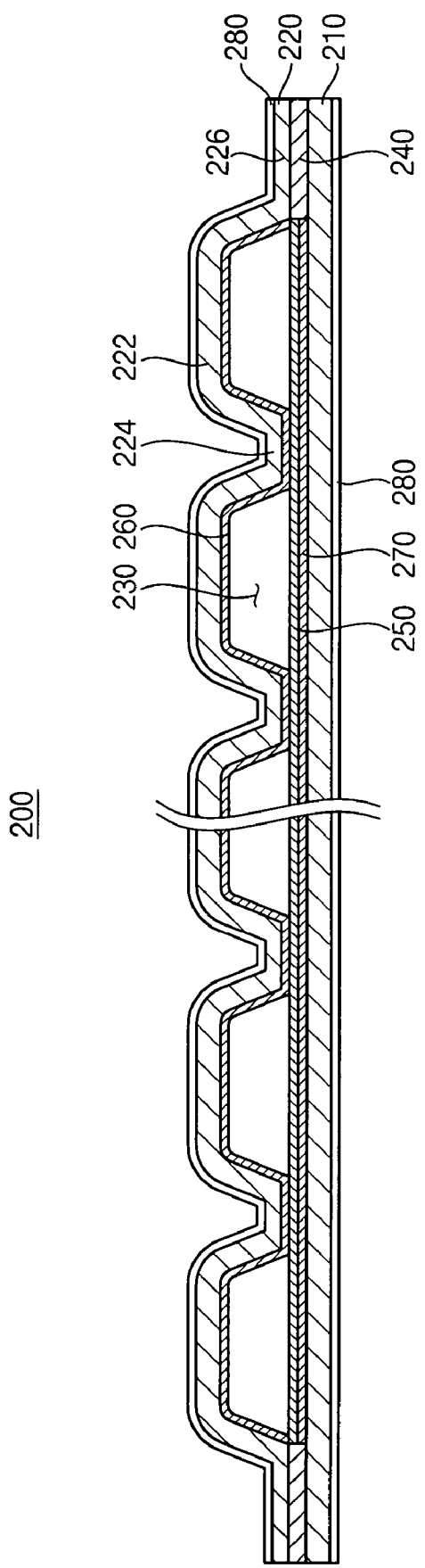
FIG. 8 is a cross-sectional view taken along line 8-8 in FIG. 7.

FIG. 7 is a perspective view illustrating a flat fluorescent lamp in FIG. 1. FIG. 8 is a cross-sectional view taken along a line 8-8 in FIG. 7.

Referring to FIGS. 7 and 8, the flat fluorescent lamp 200 includes a first substrate 210 and a second substrate 220 that is coupled to the first substrate 210 to form a plurality of discharge spaces 230 between the first and second substrates 210 and 220.

The first substrate 210 has a substantially rectangular plate shape. The first substrate 210 includes a material such as a glass. The first substrate 210 may include a material that prevents leaking of ultra-violet ray generated in the discharge space 230 through the first substrate 210.

The second substrate 220 includes a transparent material such as a glass. The second substrate 220 is manufactured by forming a glass to form a discharge space. The second substrate 220 may include a material that prevents leaking of ultra-violet ray generated in the discharge space 230 through the second substrate 220.

The second substrate 220 may be manufactured by various methods. For example, the second substrate 220 is formed by raising a temperature of a flat substrate and molding the heated substrate in a die. Also, the second substrate 220 may be manufactured by blowing a glass substrate after heating the glass substrate to raise a temperature.

The second substrate 220 includes a discharge portion 222, a space division portion 224 and a sealing portion 226. The discharge portion 222 is spaced apart from the first substrate 210, and is extended along a longitudinal direction of the flat fluorescent lamp 200 to form a discharge space 230. The space division parts 224 make contact with the first substrate 210 to divide an integral discharge space 230 into a plurality of discharge spaces 230. The sealing portion 226 is combined with the first substrate 210 at edge portions of the first substrate 210. As shown in FIG. 8, the discharge portion 222 has a substantially arched shape when viewed in a cross-section, and is arranged in a direction that is substantially perpendicular to the longitudinal direction of the discharge portion 230. Alternatively, the discharge portion 222 may have variable shapes such as a half circular shape, rectangular shape, trapezoid shape, etc.

The second substrate 220 includes a connecting tube 228 that is formed between the discharge parts 222 adjacent to each other to spatially connect the discharge spaces 230. At least two connecting tubes 228 are formed between the discharge parts 222 adjacent to each other. The connecting tube 228 provides a path through which a gas or an air passes after a discharge gas is injected into the discharge space 230. The connecting tube 228 is formed while the second substrate 230 is formed. The connecting tube 228 may have variable shapes that function as a connecting path between the discharge spaces 230. The connecting tube 228 has a substantially S-shape so as to extend the path. Therefore, the connecting tube 228 prevents a channeling effect caused by interference between the discharge spaces 230 adjacent to each other.

The first substrate 210 is combined with the second substrate 220 through a sealing member 240. The sealing member 240 includes, for example, a frit that is a mixture of metal and glass having a relatively low melting point. The frit is disposed at a portion that corresponds to the sealing portion 226. The frit disposed between the first and second substrates 210 and 220 is heated and melted to couple the first substrate 210 to the second substrate 220. The frit is heated to a temperature of about 400° C. to about 600° C.

The space division portions 224 of the second substrate 220 are cohered to the first substrate 210 by a pressure-difference between inside and outside of the flat fluorescent lamp 200. After coupling the first substrate 210 to the second substrate 220, a gas in the discharge space 230 is exhausted to be a vacuum state, and a discharge gas is injected into the discharge space 230. The discharge gas includes mercury (Hg), neon (Ne), argon (Ar), etc. The discharge space 230 has a pressure of about 50 Torr to about 70 Torr. Therefore, the pressure-difference between a pressure in the discharge space 230 and atmospheric pressure of about 760 Torr is generated. The space division portions 224 are cohered to the first substrate 210 by force caused by the above pressure-difference.

The first and second substrates 210 and 220 further include first and second fluorescent layers 250 and 260, respectively. The first and second fluorescent layers 250 and 260 are formed inside the first and second substrates 210 and 220, respectively. The first and second fluorescent layers 250 and 260 are exited by ultra-violet ray generated in the discharge spaces 230 to emit a visible light.

The flat fluorescent lamp 200 further includes a reflecting layer 270 disposed between the first substrate 210 and the first fluorescent layer 250. The reflecting layer 270 reflects a visible light generated on the first and second fluorescent layers 250 and 260 to prevent a leakage of the visible light through the first substrate 210. The reflecting layer 270 includes a material having a relatively high reflectance, for example, such as aluminum oxide ($Al_2O_3$), barium sulfate ($BaSO_4$), etc.

The first and second fluorescent layers 250 and 260, and the reflecting layer 270 are coated on the first and second substrates 210 and 220 by a spray method. The first and second fluorescent layers 250 and 260, and reflecting layer 270 are entirely formed in the flat fluorescent lamp 200 except for an area corresponding to the sealing portion 226. In further, the first and second fluorescent layers 250 and 260, and the reflecting layer 270 may not be formed on an area corresponding to the space division portion 224.

Although not shown in figures, the flat fluorescent lamp 200 may further include a protection layer (not shown) between the first substrate 210 and the reflecting layer 270. The protection layer may be formed between the second substrate 220 and the second fluorescent layer 260. The protection layer prevents a chemical reaction between mercury (Hg) and substrates to prevent blackening and a loss of mercury.

The flat fluorescent lamp 200 further includes electrodes 280 to apply a discharge voltage to the discharge spaces 230. The electrodes 280 are disposed at end portions of the flat fluorescent lamp 200, and extended in a direction that is substantially perpendicular to a longitudinal direction of the discharge portions 222. The electrodes 280 are formed on an upper surface of the flat fluorescent lamp 200, in other words, the electrodes 280 are formed on an upper surface of the second substrate 220. Alternatively, the electrodes 280 may be formed beneath the first substrate 210. Alternatively, the electrodes 280 may be formed on the upper surface of the second substrate 220 and beneath the first substrate 210. The electrodes 280 formed at the first substrate 210 are electrically connected to the electrodes 280 formed at the second substrate 220 through a connecting member such as a conductive clip (not shown). Alternatively, the electrodes 280 may be formed in the flat fluorescent lamp 200.

The electrodes 280 include a conductive material to receive the discharge voltage from the inverter 140 (shown in FIG. 1). The electrodes 280 may be formed by coating a conductive material such as a silver paste that is mixture of silver (Ag) and silicon oxide ($SiO_2$) on the substrate. Also, the electrodes 280 may be formed by spraying a metal powder including a metal or a metal mixture onto the substrate. An insulation layer (not shown) may be formed outside the electrodes 280 to protect the electrodes 280.

Figure 9:
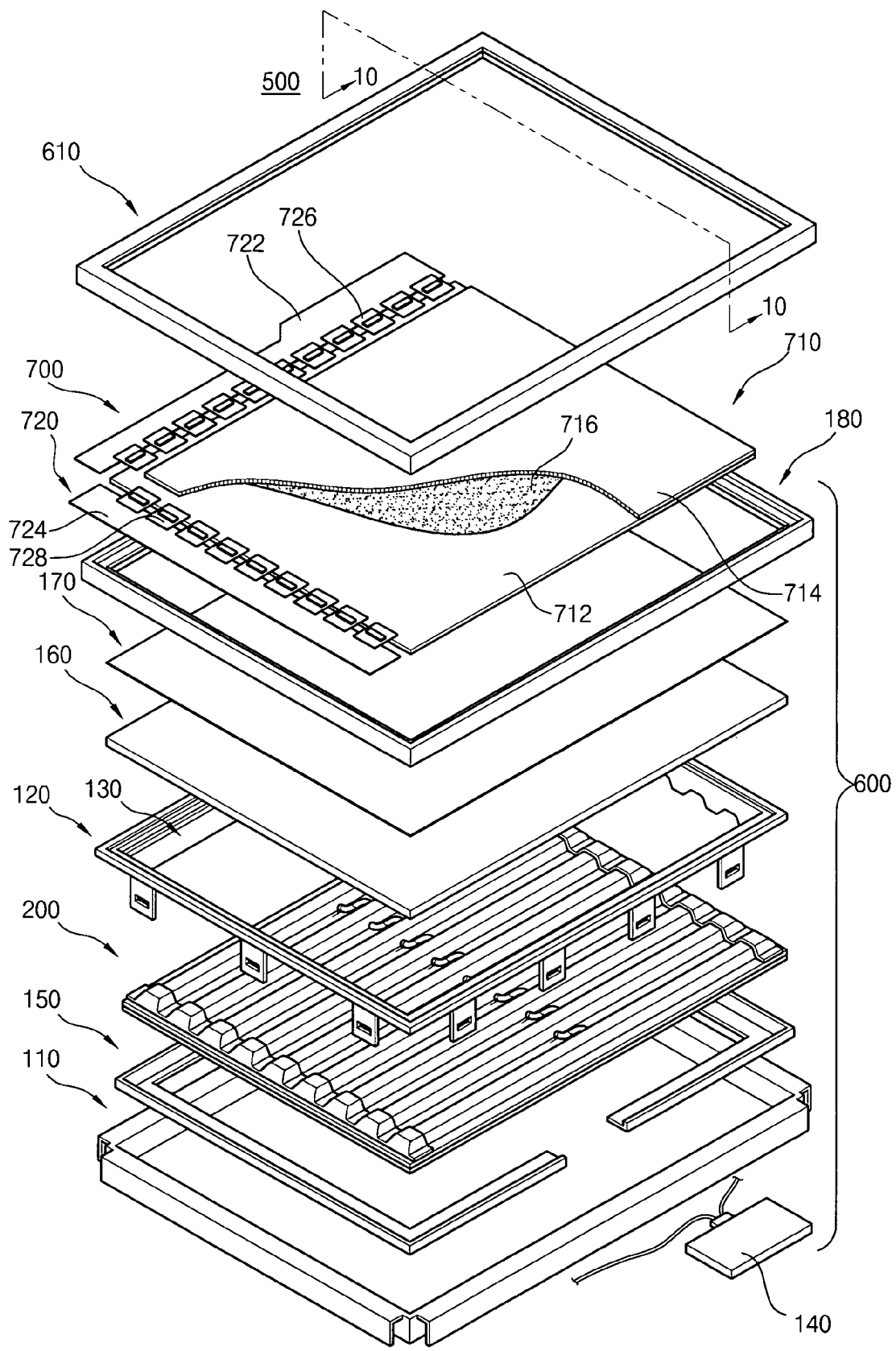
FIG. 9 is an exploded perspective view illustrating a liquid crystal display apparatus in accordance with an exemplary embodiment of the present invention.
Figure 10:
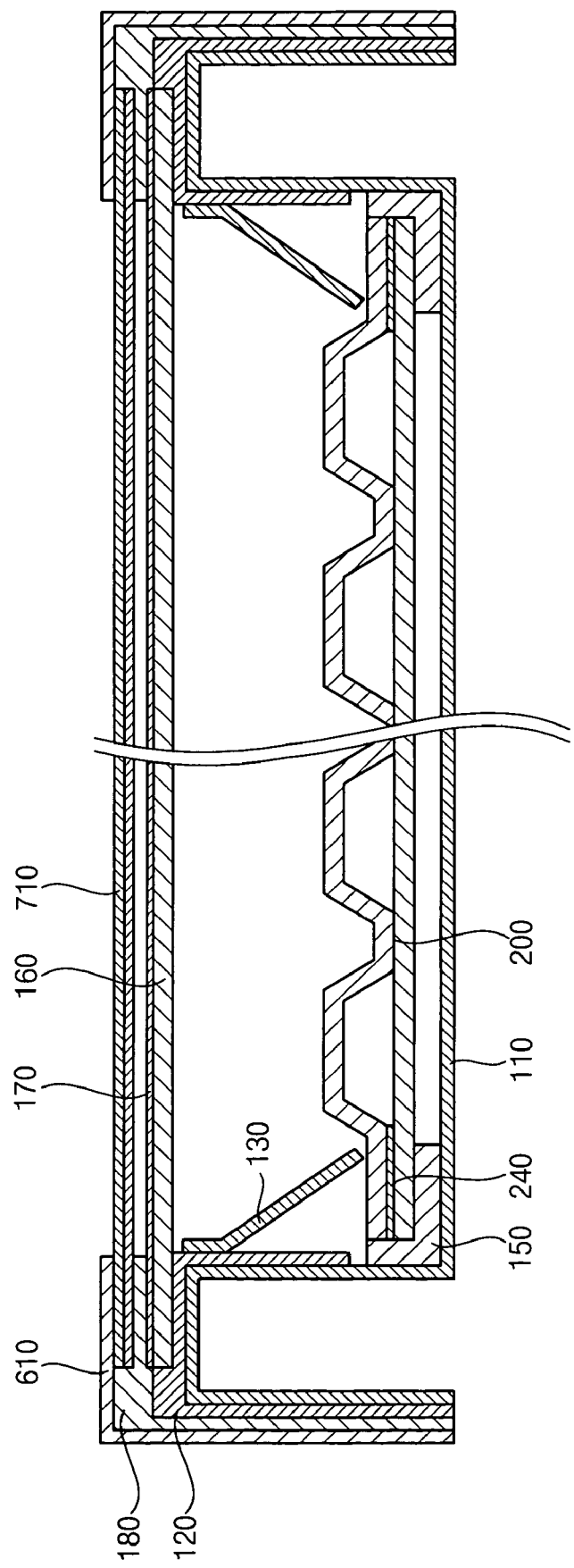
FIG. 10 is a cross-sectional view taken along line 10 of FIG. 9 illustrating the liquid crystal display apparatus of FIG. 9 in an assembled state.

FIG. 9 is an exploded perspective view illustrating a liquid crystal display apparatus in accordance with an exemplary embodiment of the present invention. FIG. 10 is a cross-sectional view taken along line 10-10 of FIG. 9 illustrating the liquid crystal display apparatus in FIG. 9 in an assembled state.

Referring to FIGS. 9 and 10, a liquid crystal display apparatus 500 includes a backlight assembly 600 and a display unit 700.

In the present embodiment, the backlight assembly 600 is functionally and structurally the same as those of the backlight assembly in FIGS. 1 to 3. Therefore, the same reference numerals are used to refer to the same or like parts as those in FIGS. 1 to 3 and no further description is necessary. Alternatively, the backlight assembly 600 in the present embodiment may be functionally and structurally the same as the backlight assembly in FIGS. 4 to 8.

The display unit 700 includes a liquid crystal display panel 710 to display an image using a backlight provided from the backlight assembly 600, and a driving circuit portion 720 to drive the liquid crystal display panel 710.

The liquid crystal display panel 710 includes a first substrate 712, a second substrate 714 facing the first substrate 712 and a liquid crystal layer disposed between the first and second substrates 712 and 714.

The first substrate 712 includes a thin film transistor (TFT) as a switching element. The first substrate 712 includes a glass. The TFT includes a source electrode, a gate electrode and a drain electrode (not shown). The source and gate electrodes are electrically connected to data and gate lines (not shown), respectively. The drain electrode is electrically connected to a pixel electrode (not shown).

The second substrate 714 is a color filter substrate including color pixels (not shown). The second substrate 714 includes a glass. The second substrate 714 has a common electrode (not shown) formed thereon, the common electrode includes conductive and transparent material.

When power is applied to the gate electrode and turns on the TFT, an electric field is formed between the pixel and common electrodes, to thereby liquid crystal molecules of the liquid crystal layer 716 are changed arrangement thereof. Therefore, the liquid crystal display panel 710 displays an image by changing a transmittance of light.

The driving circuit portion 720 includes a data printed circuit board 722, a gate printed circuit board 724, a data flexible circuit film 726 and a gate flexible circuit film 728. The data printed circuit board 722 provides a driving signal to the liquid crystal display panel 710. The gate printed circuit board 724 provides a gate driving signal to the liquid crystal display panel 710. The data flexible circuit film 726 connects the data printed circuit board 722 to the liquid crystal display panel 710. The gate flexible circuit film 728 connects the gate printed circuit board 724 to the liquid crystal display panel 710. The data and gate flexible circuit films 726 and 728 include a tape carrier package or chip on film. Alternatively, the gate printed circuit board 724 may be removed since extra signal lines are formed in the liquid crystal display panel 710 and the gate flexible circuit film 728.

The liquid crystal display apparatus 500 includes a top chassis 610 to hold the display unit 700. The top chassis 610 is coupled to a receiving container 110 to hold an edge portion of the liquid crystal display panel 710. The data printed circuit board 722 is bent by the data flexible circuit film 726 to be fixed to the side portion or bottom portion of the receiving container 110. The top chassis 610 includes a material such as a metal.

According to the above, a frame is disclosed which includes a reflective portion that extends along an edge flat fluorescent lamp, to thereby reduce a shadow and increase brightness-uniformity of the light exiting the backlight assembly. In addition, the reflective portion is spaced apart from the flat fluorescent lamp, to thereby enhance the impact resistance of the flat fluorescent lamp.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a bottom chassis including a bottom portion and a chassis sidewall extending upwards from the bottom portion;
   a light generating assembly that is disposed in the bottom chassis; and
   a first frame that is coupled to the chassis sidewall to hold the light generating assembly in the bottom chassis, wherein the first frame includes a side portion including a frame sidewall and a reflecting member, the reflecting member extending from the frame sidewall down towards the light generating assembly and away from the frame sidewall above at least a portion of the light generating assembly.

2. The backlight assembly of claim 1, wherein the light generating assembly comprises a flat type lamp and wherein the side portion of the first frame comprises:
   a first side portion facing a first edge of the flat type lamp, the first side portion including the reflecting member; and
   a second side portion facing a second edge of the flat type lamp, the second side portion being approximately perpendicular to the first side portion.

3. The backlight assembly of claim 2, wherein the reflecting member comprises:
   a coupling portion coupled to the first side portion; and
   a reflective portion extending toward the flat fluorescent lamp from the coupling portion, the reflective portion being inclined with respect to a vertical face of the first side portion to cover the edge portion of the flat fluorescent lamp.

4. The backlight assembly of claim 3, wherein the reflecting member comprises a reflective film having a relatively high reflectance.

5. The backlight assembly of claim 2, wherein the flat type lamp comprises:
   a first substrate; and
   a second substrate combined with the first substrate to form a plurality of discharge spaces between the first substrate and the second substrate, the discharge spaces extending parallel to the first edge of the flat type lamp,
   the second substrate comprising:
   a plurality of discharge parts spaced apart from the first substrate;
   a plurality of space division parts making contact with the first substrate; and
   a sealing portion extending along the first edge of the flat type lamp to combine the second substrate with the first substrate.

6. The backlight assembly of claim 5, wherein the reflecting member covers the sealing portion.

7. The backlight assembly of claim 1, further comprising:
   a diffusion plate disposed on the light generating assembly; and
   an optical sheet disposed on the diffusion plate.

8. The backlight assembly of claim 7, further comprising:
   an insulation member disposed between the bottom chassis and the light generating assembly to support at least a portion of the light generating assembly; and
   a second frame positioned in cooperative relationship with the first frame, the second frame including a portion configured to support the diffusion plate.

9. A backlight assembly comprising:
   a bottom chassis including a bottom portion and a sidewall extending upwards from the bottom portion;
   a flat type lamp disposed in the bottom chassis; and
   a first frame coupled with the chassis sidewall of the bottom chassis to hold the flat type lamp in the bottom chassis, the first frame including a side portion including a frame sidewall and a reflective portion, the reflective portion extending downwards from the frame sidewall toward the flat type lamp and above an edge portion of the flat type lamp.

10. The backlight assembly of claim 9, wherein the side portion of the first frame comprises:
   a first side portion corresponding to a first side of the flat type lamp, the first side portion including the reflective portion integrally formed thereon; and
   a second side portion corresponding to a second side of the flat type lamp, the second side portion being substantially perpendicular to the first side portion.

11. The backlight assembly of claim 10, wherein the reflective portion extends toward the flat type lamp from an upper portion of the first side portion, and wherein the reflective portion is inclined with respect to a vertical face of the first portion to cover an edge portion of the flat type lamp.

12. The backlight assembly of claim 11, wherein a terminating end of the reflective portion is spaced apart from a surface of the flat type lamp.

13. The backlight assembly of claim 11, wherein a terminating end of the reflective portion is tapered.

14. The backlight assembly of claim 11, wherein the reflective portion comprises:
   a first reflective portion inclined at a first angle with respect to the vertical face of the first side portion; and
   a second reflective portion inclined at a second angle with respect to the vertical face of the first side portion.

15. The backlight assembly of claim 14, wherein the second angle is larger than the first angle.

16. The backlight assembly of claim 9, wherein the first frame comprises a white-colored material having a relatively high reflectance.

17. The backlight assembly of claim 9, wherein the flat type lamp comprises:
   a first substrate; and
   a second substrate combined with the first substrate to form a plurality of discharge spaces between the first substrate and the second substrate, the discharge spaces extending parallel to the first side of the flat type lamp,
   the second substrate comprising:
   a plurality of discharge parts spaced apart from the first substrate;
   a plurality of space division parts making contact with the first substrate; and
   a sealing portion extending along the first side of the flat type lamp to combine the second substrate with the first substrate.

18. The backlight assembly of claim 17, wherein the reflecting member covers the sealing portion.

19. The backlight assembly of claim 9, further comprising:
   a diffusion plate disposed over the flat type lamp;
   an optical sheet disposed on the diffusion plate;
   an inverter to generate a discharge voltage and apply the discharge voltage to the flat type lamp;
   an insulation member disposed between the bottom chassis and the flat type lamp to support an edge portion of the flat type lamp; and
   a second frame disposed on the optical sheet to fix the diffusion plate and the optical sheet to the first frame.

* * * * *